United States Patent [19]

Nishimura et al.

[11] Patent Number: 4,597,611
[45] Date of Patent: Jul. 1, 1986

[54] ACTUATOR FOR ANTISKID DEVICE OF VEHICLE

[75] Inventors: Takumi Nishimura, Chiryu; Hirochika Shibata, Kariya, both of Japan

[73] Assignee: Aisin Seiki Kabushiki Kaisha, Kariya, Japan

[21] Appl. No.: 646,118

[22] Filed: Aug. 31, 1984

[30] Foreign Application Priority Data

Sep. 29, 1983 [JP] Japan .................... 58-150861[U]

[51] Int. Cl.⁴ .................................................. B60T 8/02
[52] U.S. Cl. .................................................. 303/116
[58] Field of Search ............... 303/10, 11, 92, 93, 303/103, 113, 116, 117

[56] References Cited

U.S. PATENT DOCUMENTS 3,722,960  3/1973  Von Lowis .
4,492,414  1/1985  Kozakai et al. ............... 303/116

FOREIGN PATENT DOCUMENTS

1305096  1/1973  United Kingdom .
2024354  1/1980  United Kingdom .

Primary Examiner—Duane A. Reger
Attorney, Agent, or Firm—Oblon, Fisher, Spivak, McClelland & Maier

[57] ABSTRACT

An actuator adapted to be used with the antiskid device of a vehicle and which includes cutoff valves which are capable of dividing each of the brake lines connecting the brake master cylinder of the vehicle to each brake cylinder at the wheels into two. The actuator further includes an electric motor and a high-pressure pump driven by the motor for forcing brake fluid into an accumulator. The brake fluid is also used as a mechanism for reducing braking effort when such are almost locked, i.e., for unlocking the wheels. The accumulator stores this unlocking fluid which is sufficiently pressurized to be greater than the maximum pressure that the brake fluid is under for braking action. Each piston taking the form of a right circular cylinder is advanced by the brake fluid and is withdrawn by the unlocking fluid supplied from the accumulator, so that the piston closes and opens the corresponding cutoff valve.

4 Claims, 11 Drawing Figures

ACTUATOR FOR ANTISKID DEVICE OF VEHICLE

FIELD OF THE INVENTION

The present invention relates to an actuator adapted to be used with the antiskid device of a vehicle and, more particularly, a small-sized actuator in which each of the brake lines connecting the brake master cylinder of the vehicle to each brake cylinder at the wheels can be divided into two lines, one of which communicates with the brake master cylinder and the other communicating with one or two wheel brake cylinders, by the action of cutoff valves and pistons.

BACKGROUND OF THE INVENTION

Antiskid devices for vehicles are used to enhance the stability of the direction in which the vehicle moves when it is braked, to make the driver operate the vehicle with greater ease, and to reduce the braking distance. Such device consists principally of sensors for detecting the rotational frequency of each wheel, a module for analyzing the signals delivered from the sensors and delivering a signal to lessen the braking action when one or more of the wheels are nearly locked, and an actuator for decreasing the pressure of the brake fluid and restoring it to its original value according to the signal from the module.

Various arrangements are known as the aforementioned actuator. Among these configurations, a type of actuator includes cutoff valves and pistons as mentioned previously, and the pistons are moved forward by pressurized brake fluid in the passages communicating with the wheel brake cylinders and are moved backward by hydraulic pressure generated by a power unit, in order to close and open the cutoff valves and to increase and decrease the volume in each passage communicating with the wheel brake cylinders. In the actuator of this kind, variations in the brake fluid pressure are not transmitted to the hydraulic lines communicating with the brake master cylinder. Hence, the driver can operate the brake pedal with a comfortable feeling. Further, this actuator has the advantage that it is compact as compared with an actuator which utilizes the negative pressure inside the engine-intake-manifold rather than the hydraulic pressure generated by a power unit as mentioned previously.

As described in Japanese Patent Laid-Open No. 26658/1983, the pump for the power steering device of a vehicle has heretofore been used as the aforementioned power unit. In the power steering device, a mineral oil is employed as the medium for transmitting hydraulic pressure. On the other hand, the brake fluid consists of a vegetable oil. Mineral oil and vegetable oil vary considerably in physical characteristics. Thus, if the hydraulic fluid in the power steering device intrudes into the brake lines, or inversely if the brake fluid intrudes into the hydraulic lines of the power steering device, the lines will cause problems. To prevent such an undesirable situation, an atmospheric chamber has been formed between each brake fluid seal for hermetically isolating the piston from the cylinder and each seal for the hydraulic pressure generated by the power unit so that liquid leaking out of either of these two seals may escape into the atmosphere. However, the atmospheric chamber adds to the length of the combination of the piston and the cylinder. Further, installation of other seals is needed to prevent the air inside the atmospheric chamber from intruding into the hydraulic lines. This further increases the length of the combination of the piston and the cylinder and requires additional components, resulting in an increase in the cost. In addition, the maximum hydraulic pressure that can be produced by the pump for the power steering device is much lower than the maximum pressure of the brake fluid which causes the wheels to be almost locked, and therefore the pistons and the cylinders must be designed to have stepped portions. This requires a cumbersome process to machine them, contributing to an increase in cost.

SUMMARY OF THE INVENTION

It is an object of the present invention to provide an actuator which is adapted to be used with the antiskid device of a vehicle and which is smaller and more economical to fabricate than the prior art actuator.

It is a more specific object of the invention to provide an actuator which includes pistons and cylinders all taking the form of a right circular cylinder but which has neither an atmospheric chamber as mentioned above nor seals for preventing the air inside such atmospheric chamber from intruding hydraulic lines.

These objects are achieved in accordance with the teachings of the present invention by provision of an actuator which uses brake fluid also as a medium for transmitting the hydraulic pressure generated by a power unit and which includes an accumulator for storing the medium sufficiently pressurized to exceed the maximum hydraulic pressure of the brake fluid that causes the wheels to be almost locked, a high-pressure pump for forcing the medium into the accumulator, pistons in the form of a right circular cylinder each surrounded only by a seal for the medium and a seal for the brake fluid, cylinders in the form of a right circular cylinder, and an electric motor for driving the pump.

The pistons and the cylinders of the actuator according to the present invention; are easy to machine. Further, the actuator dispenses with an atmospheric chamber as well as seals for preventing the air inside such chamber from intruding into hydraulic passages. Hence, such can be made smaller than the prior art device, and is cheaper to fabricate.

Other objects, advantages and features of the invention will be apparent from the following description of the preferred embodiment taken in conjunction with the accompanying drawings.

DETAILED DESCRIPTION OF THE PREFERRED EMBODIMENT

Figure 1:
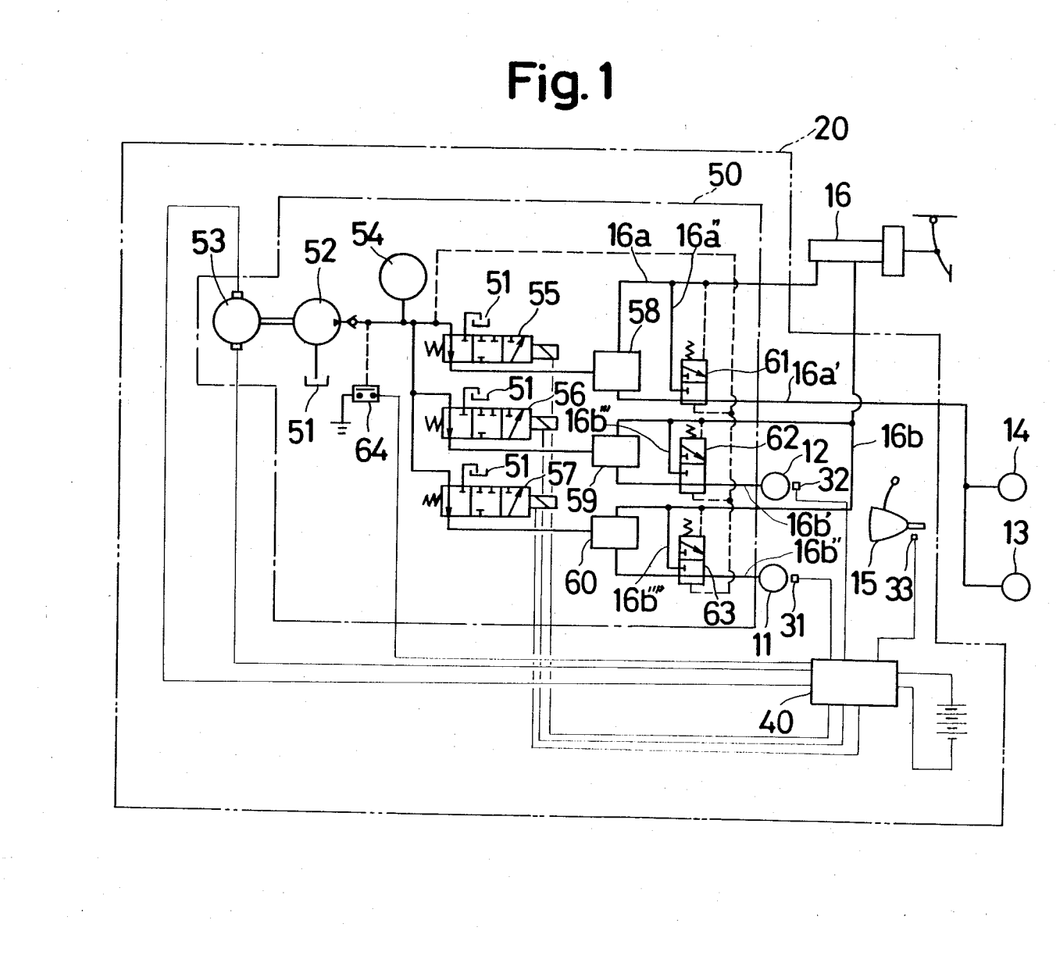
FIG. 1 is a schematic diagram of an actuator according to the present invention.
Figure 2:
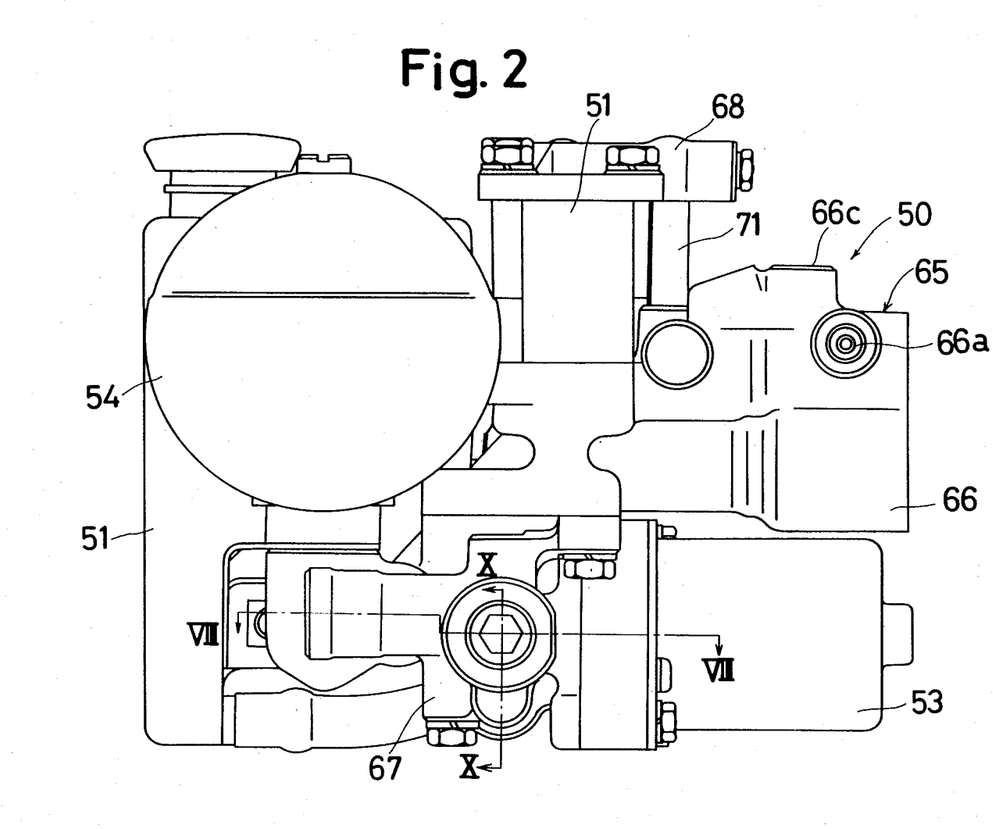
FIG. 2 is a front elevational view of the actuator shown in FIG. 1.
Figure 3:
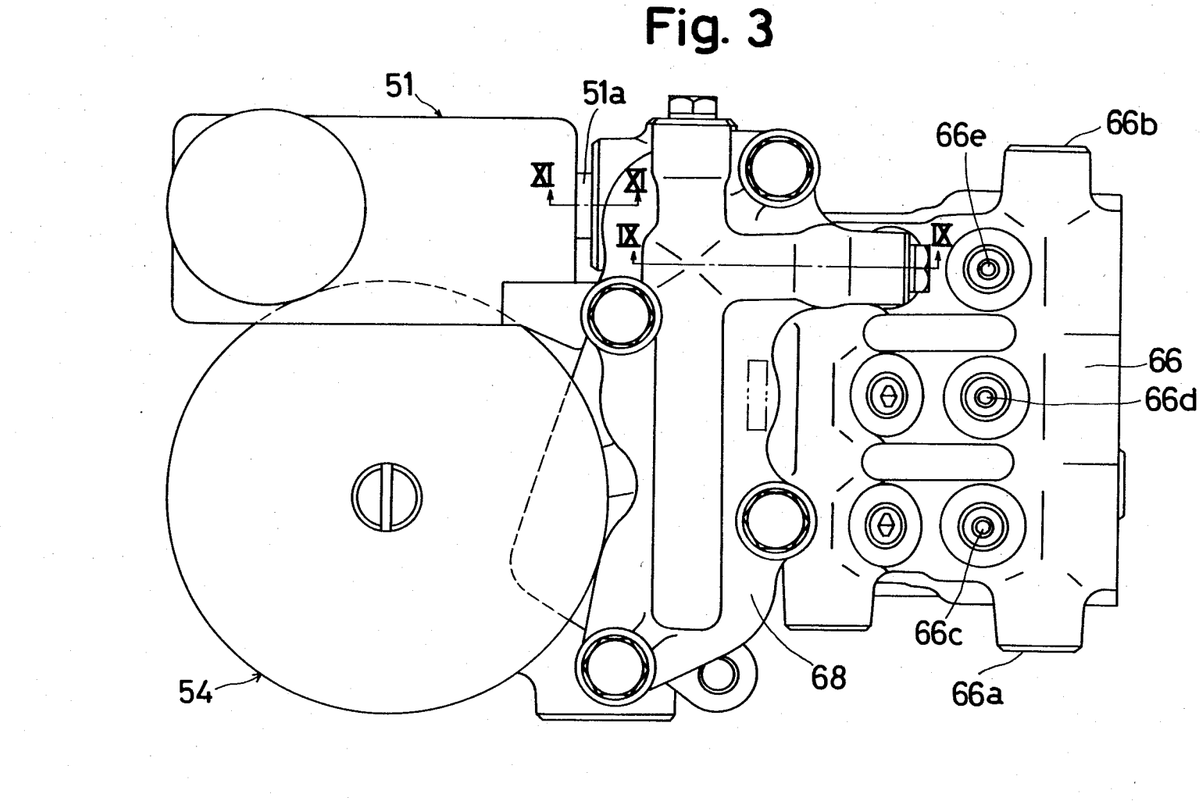
FIG. 3 is a plan view of the actuator shown in FIG. 1.
Figure 4:
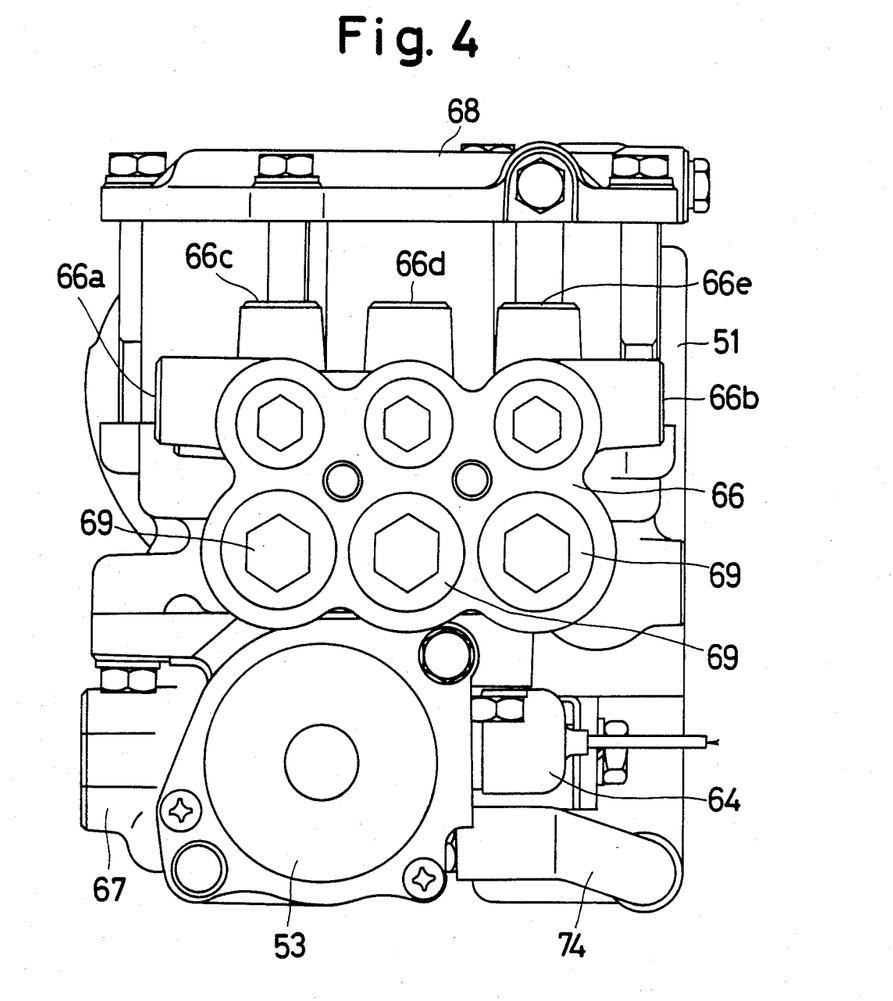
FIG. 4 is a right side elevational view of the actuator shown in FIG. 1.
Figure 5:
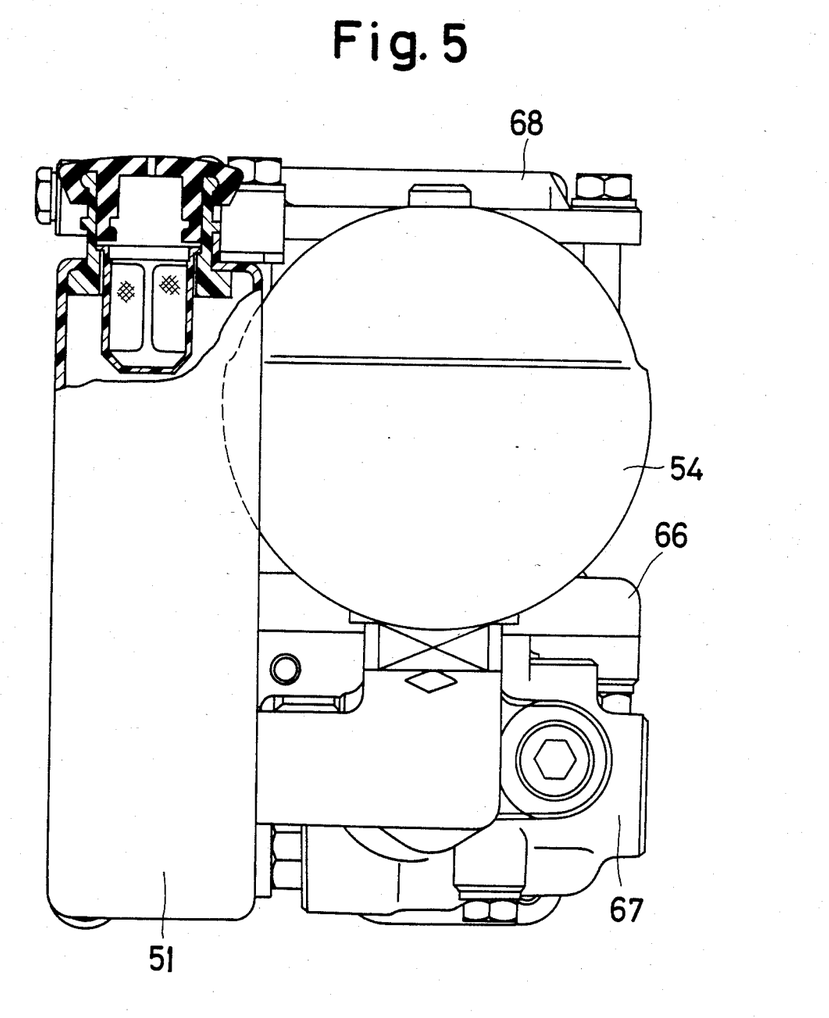
FIG. 5 is a partially cutaway left side elevational view of the actuator shown in FIG. 1.

Referring first to FIG. 1, an actuator embodying the concept of the present invention is generally indicated by reference numeral 50, and acts to independently control the pressures of brake fluid inside brake cylinders 11-14 which are installed in the front left wheel, the front right wheel, the rear left wheel, and the rear right wheel, respectively, of a vehicle in which the actuator is mounted. An antiskid device, generally indicated by reference numeral 20, consists of a sensor 31 for detecting the rotational frequency of the front left wheel, a sensor 32 for detecting the rotational frequency of the front right wheel, a sensor 33 for detecting the output rotational frequency of a transmission 15 which corresponds to the rotational frequency of the two rear wheels, a module 40, and the actuator 50.

The actuator 50 is composed of reservoirs 51, a high-pressure pump 52, an electric motor 53, an accumulator 54, solenoid valves 55, 56, 57, pistons 58, 59, 60 each of which incorporates a cutoff valve, bypass valves 61, 62, 63, and a pressure switch 64.

The reservoirs 51 serve to store the brake fluid in the brake lines extending from the wheel brake cylinders 11-14 to a brake master cylinder 16 as a medium for transmitting the hydraulic pressure generated by the high-pressure pump 52. This pump 52 is driven by the electric motor 53 to force the medium in the reservoirs 51 into the accumulator 54. If the pressure of the medium inside the accumulator 54 is lower than a preset value, the pressure switch 64 is open and signals the module 40 that the pressure is lower than the preset value. Then, the module 40 energizes a circuit for driving the motor 53. If the pressure of the medium inside the accumulator 54 is increased up to the preset value by the operation of the pump 52, then the pressure switch 64 is closed. Thereafter, the module 40 drives the motor 53 for a predetermined time and then de-energizes the circuit for driving the motor 53. Thus, the pressure of the medium stored in the accumulator 54 ranges from the preset value to a value that is higher than the preset value substantially by a given amount. The preset value is made equal to the maximum pressure of the brake fluid which causes the wheels to be almost locked when the vehicle is braked on the least slippery road.

The solenoid valves 55, 56 and 57 which are similar in structure allow the pressurized medium to be supplied from the accumulator 54 to the pistons 58-60 or vice versa, each of the pistons including the cutoff valve. These three valves 55-57 together function as a selector valve having three ports and direct hydraulic fluid to one of three selectable positions. Usually, the valves 55-57 are caused to assume a position so as to feed the medium from the accumulator 54 to the piston 58, 59 and 60 by the action of springs (described later). When the solenoid valves 55-57 are energized to a first state, they disconnect the pistons incorporating the cutoff valves from accumulator 54 and also from the reservoirs 51. When the valves are energized to a second state, they permit the pistons to communicate with the reservoirs 51.

If the medium of the pressure exceeding the preset value is supplied to the pistons 58-60 provided with the cutoff valves from the accumulator 54 through the solenoid valves 55-57, the pistons 58-60 allow hydraulic fluid passages 16a and 16b on the side of the brake master cylinder 16 to communicate with hydraulic fluid passages 16a', 16b', 16b'' on the side of the wheel brake cylinders in such a way that the volume in each fluid passage communicating with the wheel brake cylinders requires a minimum value. If they are caused to communicate with the reservoirs 51 by the operation of the solenoid valves 55-57, the pressure of the brake fluid causes the pistons 58-60 to separate the fluid passages 16a', 16b', 16b'' communicating with the wheel brake cylinders from the fluid passages 16a and 16b on the side of the brake master cylinder. At the same time, the volume in the passages 16a', 16b', 16b'' on the wheel brake cylinder side is increased to reduce the pressure of the brake fluid.

In the event that the medium is not pressurized to the given level due to failure of the high-pressure pump 52 or the electric motor 53 or for other cause, the pistons 58-60 incorporating the cutoff valves would disconnect the passages communicating with the brake master cylinder from the passages communicating with the wheel brake cylinders, making it impossible to supply the brake fluid from the master cylinder 16 to the wheel brake cylinders 11-14 via the pistons 58-60. This undesirable condition is circumvented by the action of the bypass valves 61-63. Specifically, if the pressure of the medium inside the accumulator 54 is in excess of the preset value, bypass passages 16a'', 16b''', 16b'''', are closed. If it is lower than the preset value, the force exerted by the springs to which the hydraulic pressure in the fluid passages communicating with the brake master cylinder may or may not be added opens the bypass channels, thereby assuring the braking action. Each of the above-noted pistons and cylinders are in the form of a right circular cylinder by which is meant a cylinder with a continuous axial outer periphery and thus without any stepped portion.

When the brakes are applied, the module 40 analyzes the signals from the sensors 31-33 and determines three individual conditions of rotation made by the front left wheel, the front right wheel, and either rear wheel. If the front left wheel is nearly locked, for example, the module causes the solenoid valve 57 to be energized to the second state, so that the medium is totally discharged into the reservoir 51 from the piston 60, which then operates to continuously lower the pressure of the brake fluid inside the fluid passage 16b'' communicating with the corresponding wheel brake cylinder until the front left wheel is sufficiently unlocked. Subsequently, the valve 57 is de-energized to resupply the pressurized medium into the piston 60, which then operates to increase again the pressure of the brake fluid inside the fluid passage 16b'' communicating with the corresponding wheel brake cylinder. In the latter half of this step to increase the pressure of the brake fluid again, the module 40 alternately energizes the valve 57 to the first state and de-energizes it, in order to make the pressure of the brake fluid increase more slowly for minimizing the possibility that the front left wheel is again nearly locked.

The structure of the actuator 50 is next described in detail by referring to FIGS. 2-11. The actuator 50 is installed in the engine compartment of the vehicle that faces upward as viewed in FIG. 2. The housing 65 of the actuator 50 consists of three parts 66, 67 and 68 fastened together by means of bolts. The part 66 is provided with ports 66a and 66b to which the fluid passages 16a and 16b on the side of the master cylinder are respectively connected. The part 66 is also formed with ports 66c, 66d and 66e to which the fluid passages 16a', 16b' and 16b'' on the side of the wheel brake cylinders are respectively connected. The housing part 66 incorporates the pistons 58-60 having the cutoff valves and the bypass valves 61-63. The pistons 58-60 are similar in structure. Also, the bypass valves 61-63 are similar in structure.

Figure 7:
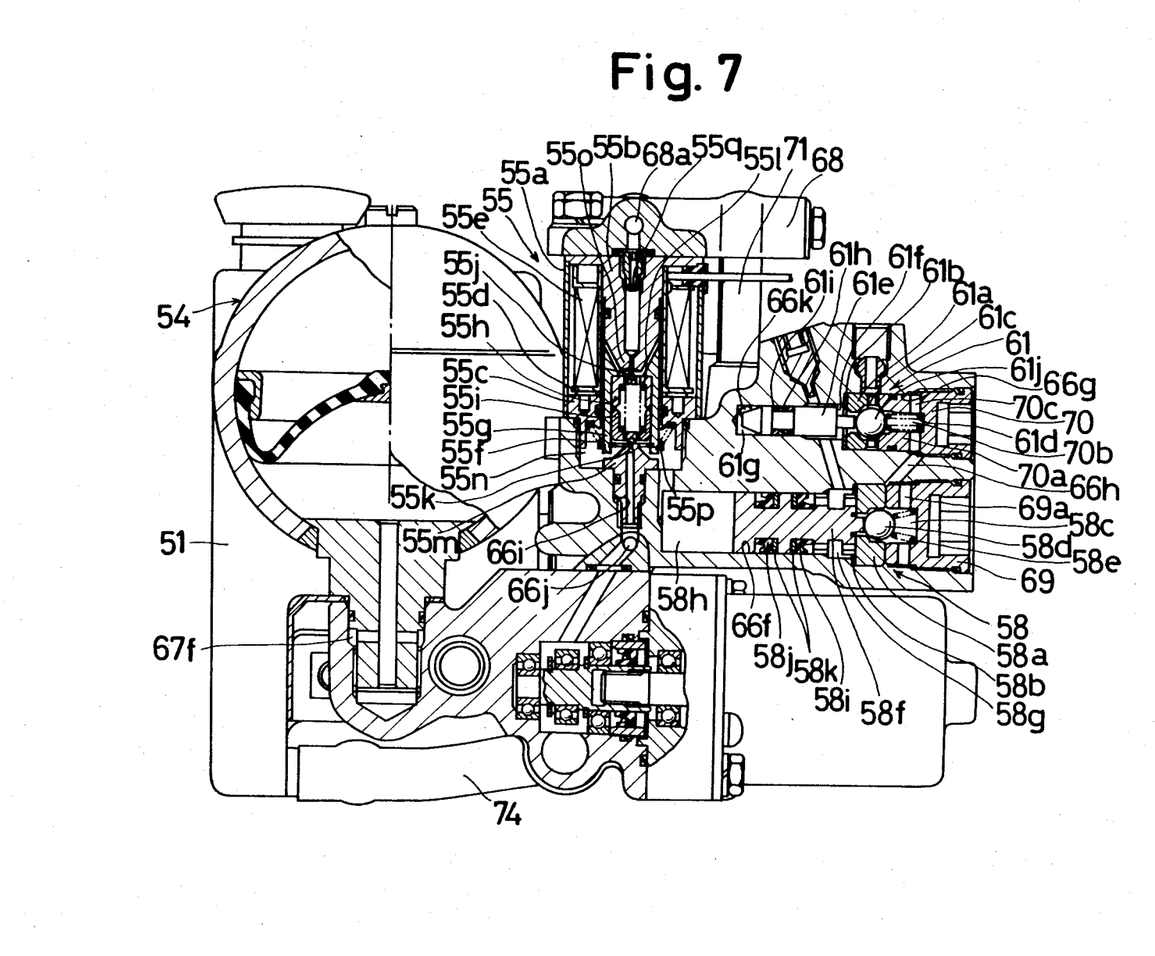
FIG. 7 is a cross-sectional view taken along the line VII—VII of FIG. 3.

Referring specifically to FIG. 7, there are shown the piston 58 and the bypass valve 61. The piston 58 comprises a cylinder 66f having an opening that is closed at one end by a plug 69. The cylinder 66f has a valve seat 58a, a seal 58b, a valve chest 58c, a ball valve 58d, a compression spring 58e, a piston 58f, a chamber 58g on which the pressure of the brake fluid acts, a second chamber 58h on which the pressure of the medium acts, an annular seal 58i made of a cup packing for the brake fluid, an annular seal 58j made of a cup packing for the medium, and back-up rings 58k. The bypass valve 61 comprises a cylinder 66g having an opening which is stopped up by a plug 70. The cylinder 66g has a valve seat 61a, a seal 61b, a valve chest 61c, a ball valve 61j, a compression spring 61d, a piston 61e, a chamber 61f on which the pressure of the brake fluid acts, a second chamber 61g on which the pressure of the medium acts, an annular seal 61h, back-up rings 61i, and the valve seat 70a of the plug 70. A hole 70b formed in the valve seat 70a is in communication with the port 66a through a hole 70c formed in the plug 70. Further, the hole 70b is in communication with the valve chest 58c through a hole 66h formed in the housing part 66 and the opening 69a in the plug 69. Thus, the pressurized fluid which has been supplied into the port 66a from the master cylinder 16 always acts on both the hole 70b and the valve chest 58c. The valve chest 61c in the bypass valve 61 is in communication with the port 66c in the housing part 66.

In the bypass valve 61, as long as the pressure of the medium exceeding a predetermined value is applied to the medium chamber 61g, the piston 61e causes the valve 61j to rest on the valve seat 70a to prevent the brake fluid from flowing into the valve chest 61c from the hole 70b. At this time, the chest 61c is placed in communication with the brake fluid chamber 58g inside the piston 58 through the chamber 61f on which the pressurized brake fluid acts. If the pressure of the medium acting on the medium chamber 61g should drop extraordinarily, the pressurized brake fluid reciprocates the piston 58f within the piston 58. Then, the force exerted by the spring 61d to which the pressurized brake fluid acting on the valve 61j or the piston 61f may or may not be added reciprocates the piston 61f to disengage the valve 61j from the valve seat 70a before the valve 58d is seated on the valve seat 58a. Then, the brake fluid is allowed to flow into the valve chest 61c from the hole 70b, and the valve 61j is seated on the valve seat 61a to keep the brake fluid from flowing back to the chamber 61f from the valve chest 61c.

In the piston 58 incorporating the cutoff valve, when the pressure of the medium acting on the chamber 58h is greater than the prescribed value, the piston 58f disengages the valve 58d from the valve seat 58a to permit the brake fluid to be admitted to the brake fluid chamber 58g from the valve chest 58c. The piston 58f bears on the seat 58a so as to maintain a minimum volume inside the brake fluid chamber 58g. If the medium chamber 58h is brought in communication with the reservoir 51, the pressurized brake fluid in the chamber 58g reciprocates the piston 58f to seat the valve 58d on the valve seat 58a for stopping the flow of the brake fluid into the brake fluid chamber 58g from the valve chest 58c. At the same time, the volume within the brake fluid chamber 58g is increased to lower the pressure of the brake fluid.

With respect to the bypass valves 62 and 63, the hole in the bypass valve 61 corresponding to the hole 70a is in communication with the hole 66b in the housing part 66. The valve chests in the bypass valves 62 and 63 which correspond to the valve chest 61c are in communication with the ports 66d and 66e, respectively, in the housing part 66. The medium chamber 61g in the bypass valve 61 and the corresponding medium chambers in the valves 62 and 63 are in communication with a communication hole 66k in the housing part 66.

With respect to the pistons 59 and 60, the valve chest 58c corresponding to the valve chest 58c in the piston 58 is connected with the port 66b in the housing part 66. The brake fluid chambers which correspond to the brake fluid chamber 58g in the piston 58 are in communication with the brake fluid chamber in the corresponding bypass valve, the latter chamber corresponding to the brake fluid chamber 61f in the bypass valve 61.

Disposed between the housing portions 66 and 68 are the solenoid valves 55, 56 and 57 which have the same structure. Valve 55 is shown in FIG. 7. Valve 55 comprises a cylindrical case 55a extending vertically, a fixed iron core 55b fitted in the case 55a at the top of the case and also serving as an end cover, a second end cover 55c that is fitted in the case 55a at the bottom of the case and made from a magnetic material, a bobbin 55d, a coil 55e wound around the bobbin, a compression spring 55f, a movable iron core 55g, two valve supports 55h and 55i fitted in the core 55g in such way that they can slide up and down in the core, ball valves 55j and 55k held by the valve supports 55h and 55i, respectively, a compression spring 55l mounted between the supports 55h and 55i, and a valve seat 55m that is fitted in a hole 66i formed in the housing part 66 such that liquid cannot enter it from below. The movable core 55g is biased downward by the compression spring 55f, and is attracted upward when the coil 55e is energized. The end cover 55c is screwed in a hole formed in the housing part 66 to constitute a hydraulic fluid chamber 55n which is in communication with the medium chamber 58h in the piston 58. When the coil 55e is not energized, the spring 55f urges the movable core 55g downward. Since the spring 55f exerts a larger force than the spring 55l, the valve 55k is seated on the valve seat 55m to disconnect the fluid chamber 55n from a reservoir communication passage 66j in the housing part 66. Downward movement of the core 55g occurs until the inner top shoulder of the core 55g abuts against the valve support 55h and causing the valve 55k, the valve supports 55i and 55h to bear on each other. Then, the valve 55j disengages from the valve seat 55o of the fixed core 55b to place the hydraulic fluid chamber 55n in communication with a medium inlet passage 68a formed in the housing part 68 through holes vertically extending through the value supports 55h and 55i.

When the coil 55e is energized with the smaller two given electric currents, i.e., the coil is energized to a first state, the movable core 55g is attracted upward, seating the valve 55j on the valve seat 55o. Under this condition, a retaining ring 55p fixed to the inner bottom end of the core 55g is not in contact with the valve support 55i. Further, the force of attraction acting on the movable core 55g is not so large as to overcome the sum of the forces exerted by the springs 55f and 55l. Therefore, the upward movement of the core 55g is terminated when the retaining ring 55p comes into abutting engagement with the valve support 55i, whereupon the hydraulic fluid chamber 55n is disconnected from the reservoir communication passage 66j and from the medium inlet passage 68a.

When the coil 55e is energized with the larger current, i.e., the coil is energized to a second state, a force of attraction that is large enough to overcome the sum of the forces exerted by the springs 55f and 55l acts on the movable core 55g, moving the core 55g and the valve support 55i upward. Then, the valve 55k moves away from the valve seat 55m to bring the hydraulic fluid chamber 55n in communication with the reservoir communication passage 66j. An orifice 55q is formed to permit the flow of fluid to be adjusted.

With respect to the solenoid valves 56 and 57, the hydraulic fluid chambers in the valves 56 and 57 which correspond to the hydraulic fluid chamber 55n in the solenoid valve 55 communicate with the medium chambers in the pistons 59 and 60, respectively.

Figure 9:
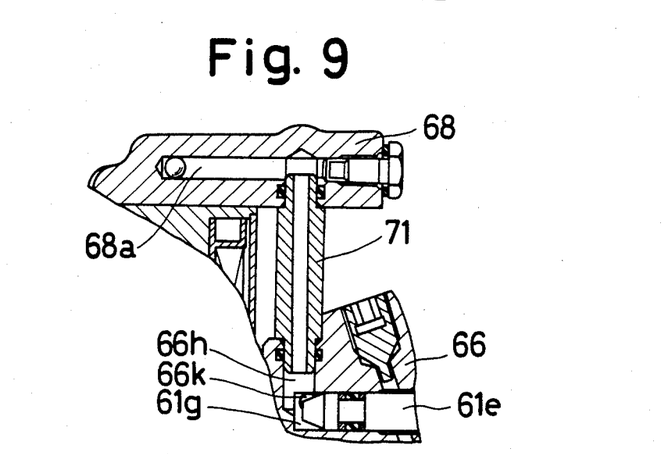
FIG. 9 is a cross-sectional view taken along the line IX—IX of FIG. 3.

Referring to FIG. 9, the communication passage 68a in the housing portion 68 is in communication with the port 66h in the housing part 66 through a communication tube 71, which is connected with the communication hole 66k.

Figure 8:
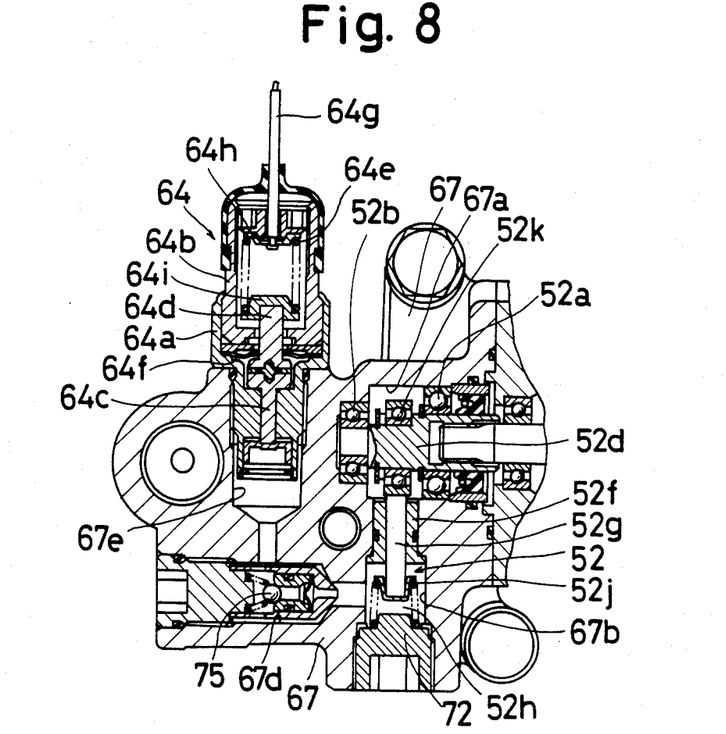
FIG. 8 is a cross-sectional view taken along the line VIII—VIII of FIG. 2.

Referring next to FIGS. 7 and 8, the high-pressure pump 52 is incorporated in the housing portion 67 and comprises a cam shaft 52d, a seal 52e, a support 52f, a plunger 52g that is held by the support 52f so as to be able to reciprocate in a cylinder 67a inside the housing portion 67, a pump chamber 52h formed between a plug 72 and the support 52f, a retainer 52i supported by the plunger 52g in the pump chamber 52h, a compression spring 52j mounted between the retainer 52i and the plug 72, and a bearing 52k which is mounted at a position displaced from the geometrical center of the cam shaft 52d and engages with the plunger 52g. The cam shaft 52d which is supported by bearings 52a and 52b in the cylinder 67a is connected to the rotating shaft 53a of the DC electric motor 53 which is securely fixed to the housing portion 67. The opening of the cylinder 67a is hermetically isolated from the cam shaft 52d by the seal 52e. As the cam shaft 52d is turned by the motor 53, the plunger 52g is moved into and out of the pump chamber 52h.

Figure 6:
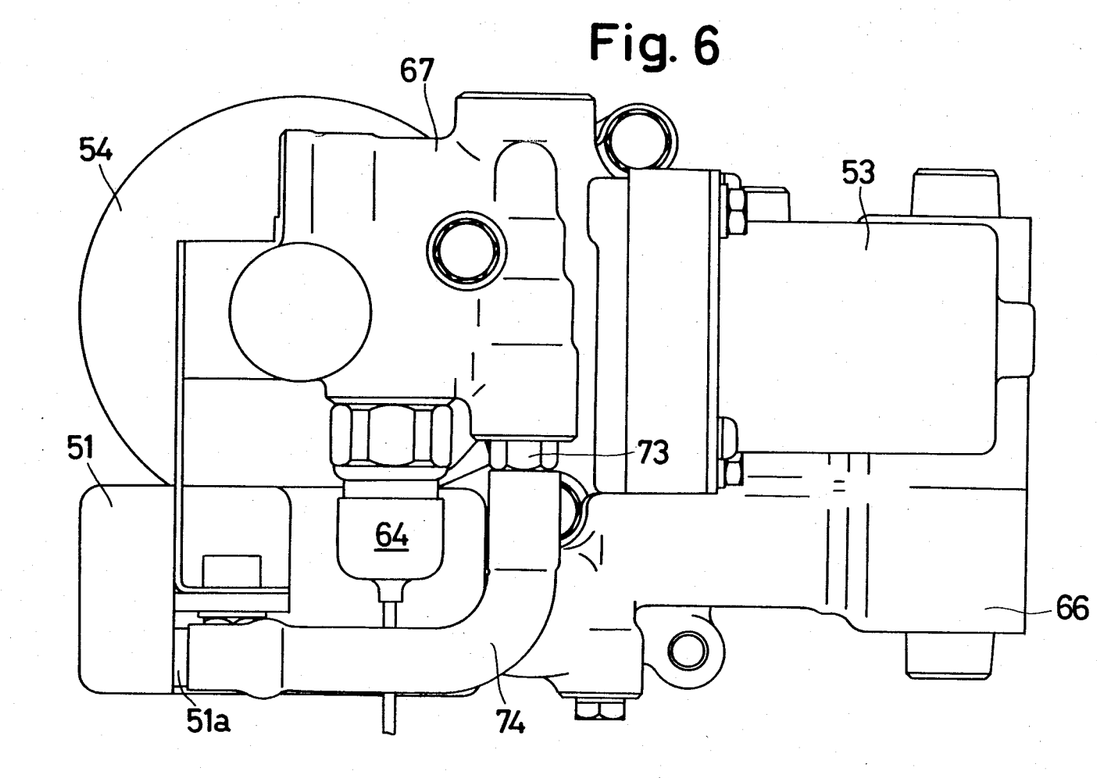
FIG. 6 is a bottom view of the actuator shown in FIG. 1.
Figure 10:
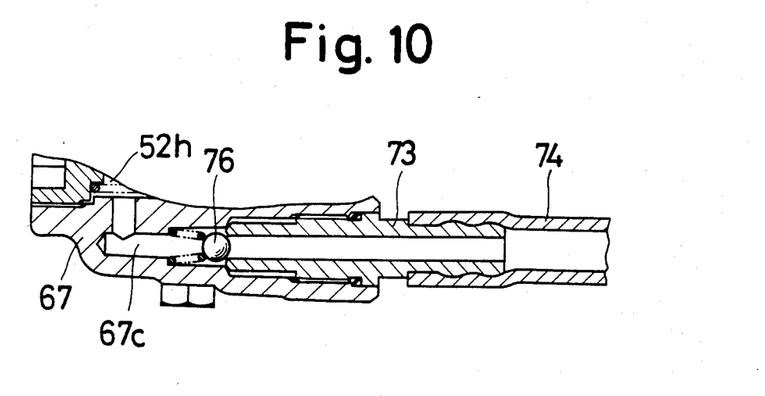
FIG. 10 is a cross-sectional view taken along the line X—X of FIG. 2.

As shown in FIG. 10, the pump chamber 52h is in communication with the inlet passage 67c in the housing portion 67. A check valve 76 for suction is included in the passage 67c and has a valve seat which is defined by the inner end portion of a union plug 73, which is in communication with an outlet 51a at the bottom of the reservoir 51 through a hose 74, as shown in FIG. 6. As shown in FIG. 8, the pump chamber 52h is in communication with an exhaust passage 67d in the housing portion 67 that incorporates a check valve 75 for discharge. The pressurized fluid which is discharged from the pump chamber 52h through the check valve 75 passes through a hole 67e in the housing portion 67 for installing a pressure switch and flows into a hole 67f for installing an accumulator. The hole 67e is in communication with a slant passage (not shown) which is formed in the housing portions 67 and 66 so as to communicate with the passage 66k in the housing portion 66.

Figure 11:
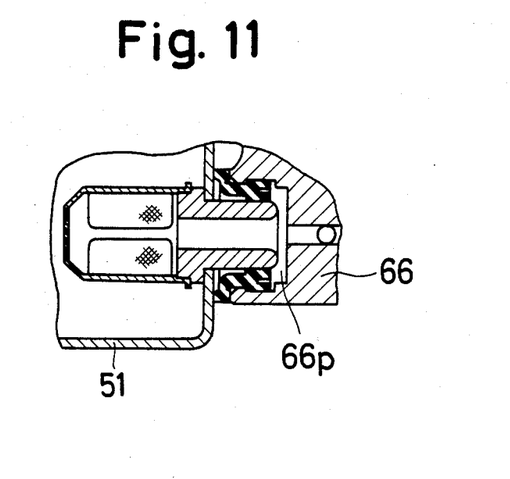
FIG. 11 is a cross-sectional view taken along the line XI—XI of FIG. 3.

As shown in FIG. 11, the reservoir 51 has an inlet 51b that is in communication with outlet 66p for the reservoir in the housing portion 66. The outlet 66p is in communication with the reservoir communication passage 66j.

As shown in FIG. 8, the pressure switch 64 consists principally of a housing 64a made from an electrically conductive material, a housing 64b made from an insulator, a plunger 64c that responds to hydraulic pressure, a movable contact 64d, a spring 64e, a fixed contact 64f, and a lead wire 64g. The housing 64a is screwed in the hole 67e for installation of the pressure switch in a liquidtight manner. The movable contact 64d is connected to the plunger 64c via an insulator, and can come into contact with the fixed contact 64f by moving upward against the resilient force of the spring 64e. The wire 64g is electrically connected to the housing 67 through a retainer 64h, the spring 64e, a retainer 64i, the movable contact 64d, the fixed contact 64f, and the housing 64a for grounding purposes. Usually, the pressure switch 64 is open.

Since many variations, modifications and changes in detail can be made to the embodiment described above, it is intended that all matter in the foregoing description and shown in the accompanying drawings be interpreted as being illustrative and not in a limiting sense.

What is claimed is:

1. An actuator adapted to be used with the antiskid device of a vehicle utilizing a power unit, the actuator comprising:
    a plurality of cutoff valves capable of dividing each of the brake lines connecting the brake master cylinder of the vehicle to the wheel brake cylinders into first and second hydraulic fluid passages wherein said first passage communicates with the brake master cylinder and said second passage communicates with at least one of said wheel brake cylinders;
    a plurality of pistons which are advanced by the hydraulic fluid in the hydraulic fluid passages communicating with the wheel cylinders and are withdrawn by a first hydraulic pressure generated by said power unit to close and open said cutoff valves, said pistons also acting to increase and decrease the volume in each hydraulic fluid passage communicating with the wheel brake cylinders, and said first hydraulic pressure being transmitted through the brake fluid;
    an accumulator for storing a second hydraulic pressure exceeding a maximum hydraulic pressure of the brake fluid which nearly locks the wheels;
    a high-pressure pump constituting said power unit and acting to force said first hydraulic pressure into the accumulator;
    an electric motor for driving the high-pressure pump;
    a plurality of cylinders within which said pistons are fitted, each of the cylinders and pistons having the form of a cylinder; and
    a plurality of seals respectively attached to an outer periphery of said pistons.

2. An actuator as set forth in claim 1, wherein each of the seals further comprises a seal member for the first hydraulic pressure generated by the pump and a seal member for the brake fluid.

3. An actuator as set forth in claim 1, further comprising:
- at least one reservoir for storing the hydraulic fluid to be pressurized by the pump;
- a plurality of solenoid valves for controlling the action of the hydraulic fluid pressurized by the pump upon the pistons; and
- a plurality of bypass valves for bypassing the cutoff valves between the brake master cylinder and each wheel brake cylinder in response to a drop in the first hydraulic pressure generated by the pump.

4. An actuator as set forth in claim 3, wherein further comprising a housing having an upper portion, an intermediate portion and a lower portion coupled together, the intermediate portion of the housing having the cutoff valves positioned therein, the pistons and the bypass valves being further mounted therein, the lower portion of the housing having the accumulator positioned therein, the high-pressure pump and the electric motor being mounted therein, and the solenoid valves being mounted between the upper and intermediate portions of the housing.

* * * * *